L. P. SÉBILLE.
WELDING FLAME.
APPLICATION FILED DEC. 7, 1916.
1,325,116.
Patented Dec. 16, 1919.
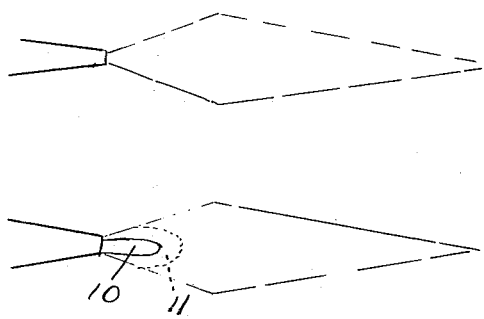
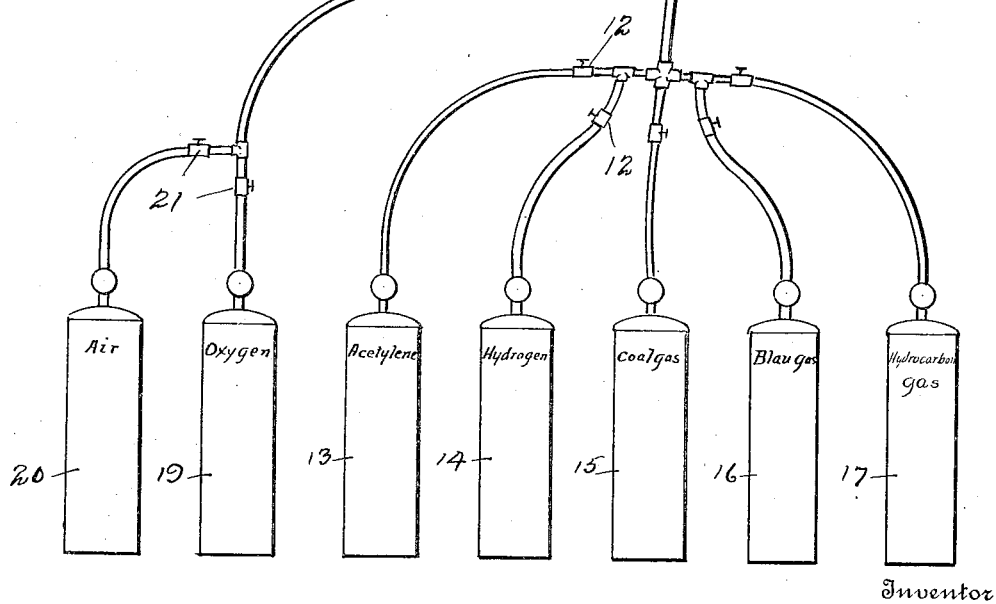

UNITED STATES PATENT OFFICE.

LÉO PAUL SÉBILLE, OF PROVIDENCE, RHODE ISLAND.

WELDING-FLAME.

1,325,116. Specification of Letters Patent. Patented Dec. 16, 1919.

Application filed December 7, 1916. Serial No. 135,544.

*To all whom it may concern:*

Be it known that I, LÉO PAUL SÉBILLE, a citizen of the United States, and resident of the city of Providence, in the county of Providence and State of Rhode Island, have invented certain new and useful Improvements in Welding-Flames, of which the following is a specification.

This invention relates to a process of producing an improved flame for the purpose of welding metals and the like by the so-called autogenous method, and this invention has for its object to provide a combination of gases for such a flame consisting of a mixture of one or more combustible gases and to burn this mixture in connection with one or more combustion supporting gases for the purpose of producing a flame whose temperature may be regulated to accommodate itself to the different fusing points of the material on which it is operating.

Another object of this invention is to provide such a mixture of gases as to produce a good welding flame using mainly gases that when burned alone in connection with air or pure oxygen, produce none or very little neutral zone, and I am also able to nicely regulate the temperature of this flame.

A still further object of this invention is to provide a compound gas effective in producing a welding flame whose temperature may be regulated, and which gas combines mainly inexpensive gases, which mixture has not heretofore been utilized for this purpose, thereby materially reducing the cost of welding.

This invention further consists in so mixing the gases that a flame is produced which has a cone so soft that it will yield, bend and spread if accidentally brought into direct contact with the melted or softened surface on the metal, instead of penetrating this yielding surface, which is the case with the usual oxyacetylene flame, and which penetrating effect will bore holes, move the softened material about, cause a dissolution of the gas, and the carbonization of the metal, and also forms blow holes in the work, all of which highly objectionable effects would not be possible by the use of my improved flame even when brought into too close proximity to the work.

With these and other objects in view, this invention consists of certain novel features as will be more fully described and particularly pointed out in the appended claims.

In the accompanying drawings:

Figure 1— is a diagrammatic view illustrating a blow pipe or torch in the act of welding pieces of material together; the torch being arranged to be connected to various gas containers carrying different kinds of gases, whereby the desired combination or mixture of gases may be provided for producing the desired flame.

Fig. 2— is a view illustrating the usual oxyhydrogen flame which has no cone and practically no neutral zone therein.

Fig. 3— is a view illustrating my improved flame which is produced by using mainly hydrogen gas as combustible whereby a cone of practical shape and size and also a suitable neutral zone is produced.

The usual autogenous welding is produced by a combination of acetylene and oxygen gases, which combination of gases produces what is known as the oxyacetylene flame which has a cone and a neutral zone, but this flame is very expensive to produce and has the disadvantage of having a temperature which is too high for general use as it burns the metal unless great care is taken in handling the same.

This flame also has a cone which is very hard and which will if carried too close to the soft metal carbonize the metal, and push, force, or move away that portion of the metal which is melted or softened boring holes in the same and giving a greater chance for the dissolution of the gas and also the making of blow holes in the weld which is particularly objectionable.

To obviate these difficulties, I mix hydrogen, or coal gas or Blau gas, or a hydrocarbon gas with a very little of acetylene gas. This mixture when burned in connection with pure oxygen, will produce a flame which has a cone 10, see Fig. 3, of the desired size and will produce a neutral zone 11 as illustrated by dotted lines in this figure, which is large enough to protect the melted metal from oxidization and the cone 10 is so soft that it will bend, yield and spread upon coming in contact with the molten metal effectually preventing injury to the soft metal and also prevent carbonization of the same.

In some cases it is found in practice that air or other combustion supporting gases may replace or be mixed with pure oxygen and this mixture burned in connection with a mixture of the combustible gases. In this case, gases such as air or other combustion supporting gases may be used instead of pure oxygen in combination with the combustible gases if desired, the proportions of each being regulated by manipulating the different valves 12 to suit conditions under which the flame is being operated.

An important feature in the use of a flame formed by my improved mixture of gases, the temperature of whose flame may be regulated, is that by its use steel or iron of any thickness may be welded, which is not the case with the ordinary oxyhydrogen or oxycoalgas flame as the thickness of stock capable of being welded by this flame is decidedly limited.

I have shown a number of tanks designated as containing different gases, which are divided up into two groups, one of combustible gases such as acetylene in tank 13, hydrogen 14, coal gas 15, Blau gas 16 and hydrocarbon gas 17 all of which tanks are shown as connected to the torch pipe 18 and a flow of any combination of these gases may be controlled through the various valves 12 to obtain the desired mixture, while the other group shows a tank 19 of pure oxygen and another tank 20 which may contain air or other combustion supporting gas, any desired mixture of which gases in the pipe 22 may be obtained by regulating the valves 21.

The combustion supporting gas in pipe 22 leads through the torch head 23 and the combustible gases lead through pipe 18 also into the torch head where these two groups are united and pass together through the nozzle 24 at the apex of which they are ignited and this flame is held by the operator the desired distance from the portion of the work 25, to be welded as illustrated at 26.

Having thus described one illustrative embodiment of my invention and the best mode known to me for carrying out my method, I desire it to be understood that although specific terms are employed, they are used in a generic and specific sense and not for the purpose of limitation, the scope of the invention being defined by the appended claims.

I claim:

1. An improved process of producing a welding flame consisting in mixing together two or more combustible gases and burning this mixture in connection with a combustion supporting gas, the proportion of the different gases being regulated to produce a flame of the desired temperature.

2. An improved process of producing a welding flame, consisting in mixing together hydrogen and acetylene gases and burning this mixture with oxygen, the proportion of each of the different gases being regulated to produce a flame of the desired temperature.

3. An improved process of producing a welding flame which consists in regulating the flow of each of two or more combustible gases to a mixing chamber, and burning the mixed gases in connection with a combustion supporting gas.

4. An improved process of producing a welding flame which consists in regulating the flow of two or more combustible gases to form a mixture, and regulating the flow of such mixture and the flow of a combustion supporting gas to form a final mixture, and burning said final mixture.

In testimony whereof I affix my signature.

LÉO PAUL SÉBILLE.